(12) United States Patent
Akisada et al.

(10) Patent No.: US 9,813,109 B2
(45) Date of Patent: Nov. 7, 2017

(54) COMMUNICATION SYSTEM AND COMMUNICATION METHOD

(71) Applicant: YOKOGAWA ELECTRIC CORPORATION, Musashino-shi, Tokyo (JP)

(72) Inventors: Yukiyo Akisada, Musashino (JP); Kazunori Miyazawa, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 31 days.

(21) Appl. No.: 13/665,084

(22) Filed: Oct. 31, 2012

(65) Prior Publication Data
US 2013/0107804 A1    May 2, 2013

(30) Foreign Application Priority Data

Oct. 31, 2011  (JP) .................................. 2011-238828

(51) Int. Cl.
*H04B 1/7143* (2011.01)
*H04W 74/00* (2009.01)
(Continued)

(52) U.S. Cl.
CPC ........ *H04B 1/7143* (2013.01); *H04W 74/002* (2013.01); *H04W 8/183* (2013.01);
(Continued)

(58) Field of Classification Search
None
See application file for complete search history.

(56) References Cited

U.S. PATENT DOCUMENTS 5,737,358 A * 4/1998 Ritz et al. ...................... 375/133
8,422,401 B1 * 4/2013 Choong et al. ............... 370/254
(Continued)

FOREIGN PATENT DOCUMENTS

CN   101828368 A   9/2010
JP   08-331127 A   12/1996
(Continued)

OTHER PUBLICATIONS

ISA-100.11a-2009 An ISA "Standard Wireless Systems for Industrial Automation: Process Control and Related Applications", The Instrumentation, Systems, and Automation Society. Relevant pages include Paragraph 9.1, pp. 249-314, Paragraph 9.3 pp. 317-338, and Chapter 14, pp. 666-693, cited in specification.
(Continued)

*Primary Examiner* — Faruk Hamza
*Assistant Examiner* — Cassandra Decker
(74) *Attorney, Agent, or Firm* — Westerman, Hattori, Daniels & Adrian, LLP

(57) ABSTRACT

A communication system constructs a communication network using a hopping pattern designated in a router advertisement between a wireless communication device that transmits the router advertisement designating the hopping pattern of channel hopping and an opposite party communication device that receives the router advertisement. The wireless communication device comprises a receiver configured to receive a router advertisement transmitted from another wireless communication device, a generator configured to generate the hopping pattern that does not use the same channel at the same time with respect to a hopping pattern that is designated by the router advertisement received by the receiver, and a transmitter configured to transmit the router advertisement that designates the hopping pattern generated by the generator.

12 Claims, 8 Drawing Sheets

(51) Int. Cl.
| | |
|---|---|
| *H04W 72/04* | (2009.01) |
| *H04W 40/24* | (2009.01) |
| *H04W 28/18* | (2009.01) |
| *H04W 92/18* | (2009.01) |
| *H04W 8/18* | (2009.01) |

(52) U.S. Cl.
CPC .......... *H04W 28/18* (2013.01); *H04W 40/244* (2013.01); *H04W 72/0453* (2013.01); *H04W 92/18* (2013.01)

(56) References Cited

U.S. PATENT DOCUMENTS

| | | | |
|---|---|---|---|
| 2004/0125776 A1* | 7/2004 | Haugli et al. | 370/338 |
| 2008/0112885 A1* | 5/2008 | Okunev et al. | 424/9.1 |
| 2008/0137581 A1* | 6/2008 | Doppler | H04B 7/15557 370/315 |
| 2009/0316628 A1* | 12/2009 | Enns | H04L 12/40006 370/328 |
| 2010/0296493 A1 | 11/2010 | Lee et al. | |
| 2011/0096703 A1* | 4/2011 | Nentwig | H04B 7/2643 370/294 |
| 2011/0122922 A1* | 5/2011 | Eriksson Lowenmark | H04B 7/2615 375/135 |
| 2011/0176464 A1* | 7/2011 | Warner et al. | 370/311 |
| 2011/0182421 A1* | 7/2011 | Lablans | 380/28 |
| 2011/0235684 A1 | 9/2011 | Dahlman et al. | |
| 2012/0026941 A1* | 2/2012 | Ahmad et al. | 370/328 |
| 2012/0069869 A1* | 3/2012 | Jeong et al. | 375/132 |
| 2012/0163599 A1* | 6/2012 | Ware et al. | 380/270 |
| 2013/0016759 A1* | 1/2013 | Hui | H04B 1/713 375/135 |

FOREIGN PATENT DOCUMENTS

| | | |
|---|---|---|
| JP | 10-013380 A | 1/1998 |
| JP | 11-8586 A | 1/1999 |
| JP | 2009-130530 A | 6/2009 |
| JP | 2010-114742 A | 5/2010 |

OTHER PUBLICATIONS

Extended European Search Report dated Nov. 20, 2013, issued in corresponding European Patent Application No. 12190424,7.
H. Su et al., "Channel-Hopping Based Single Transceiver MAC for Cognitive Radio Networks", Information Sciences and Systems, Mar. 19, 2008, pp. 197-202; cited in Extended European Search Report dated Nov. 20, 2013.
S. Yamamoto et al., "Field Wireless Solution Based on ISA100.11a to Innovate Instrumentation" Yokogawa Technical Report English Edition vol. 53, No. 2, 2010 (5 pages); cited in Extended European Search Report dated Nov. 20, 2013.
S. Rhee et al., "OSIA Standards & Technology Review Journal", vol. 23, No. 3, Sep. 2010 (50 pages); cited in Extended European Search Report dated Nov. 20, 2013.
Japanese Office Action dated Sep. 10, 2013, issued in corresponding Japanese Patent Application No. 2011-238828 (2 pages).
Japanese Office Action dated Jan. 21, 2014, in corresponding to Japanese Patent Application No. 2011-238828.
ISA-100. 11a-2011 (chapter 9 and 14), "Wireless system for industrial automation: Process control and related applications", Chapter 9,, pp. 253-385 and Chapter 14, pp. 651-679, Cited in CN Office Action dated Mar. 9, 2015, issued in corresponding Chinese Patent Application No. 201210429716.4.
Translation of Office Action dated Aug. 4, 2015, issued in counterpart Chinese Patent Application No. 201210429716.4 (8 pages).
Hongsheng, "12.3.2 Method of Generating Hopping Pattern", Operation Satellite Communication Engineering, 1994, pp. 607-612.

* cited by examiner

COMMUNICATION SYSTEM AND COMMUNICATION METHOD

CROSS-REFERENCE TO RELATED APPLICATION(S)

The present application claims the benefit of priority of Japanese Patent Application No. 2011-238828, filed on Oct. 31, 2011. The disclosures of this application are incorporated herein by reference.

BACKGROUND

Technical Field

The present invention relates to a communication system which constructs a communication network using a hopping pattern designated in a router advertisement between a wireless communication device that transmits the router advertisement that designates the hopping pattern of channel hopping and an opposite party communication device that receives the router advertisement.

Related Art

In ISA100.11a, provisioning means an engineering for performing initial setting of a network parameter and a security parameter in order to connect a wireless device to a wireless infrastructure. As the provisioning that is prescribed as the specification of ISA100.11a, there is OTA (Over The Air) provisioning that is performed using the ISA100.11a protocol, and the OTA provisioning is classified into handheld OTA provisioning and tool-less OTA provisioning.

In the handheld OTA provisioning, initial setting of a wireless device (DBP: Device Being Provisioned) is performed on an ISA100.11a wireless subnet (provisioning network) that is physically isolated from an ISA100.11a wireless infrastructure (target network) using a handheld PD (Provisioning Device) that is a dedicated device. The wireless device (DBP) is connected to the target network after the provisioning is performed in the provisioning network.

Hereinafter, the procedure of the handheld OTA provisioning will be described.

(1) Step 1

A handheld PD 101 including a routing device function periodically broadcasts a router advertisement. A circle shown in FIG. 8A expresses a range in which the wireless device (DBP) 102 can receive the router advertisement. The range in which the router advertisement can be received corresponds to the provisioning network.

(2) Step 2

In the router advertisement, a network parameter that is required for the wireless device (DBP) 102 to connect to the provisioning network is stored, and the wireless device (DBP) 102 can acquire the network parameter through receiving the router advertisement, and connect to the provisioning network. Further, an actual connection process includes a plurality of transactions.

(3) Step 3

If the connection of the wireless device (DBP) 102 to the provisioning network is completed, the handheld PD sets the network parameter and the security parameter for connecting the wireless device (DBP) 102 to the target network. Further, an actual setting process includes a plurality of transactions.

In ISA100.11a, communication is performed by TDMA (Time Division Multiple Access) using channel hopping, and in step 2, the handheld PD notifies the wireless device (DBP) of the hopping pattern to be used in practice. This hopping pattern is selected from the five default channel hopping patterns predefined in ISA100.11a.

The channel hopping is managed at absolute time on the basis of a zero point of international atomic time, and the router advertisement that is transmitted by the handheld PD includes a hopping offset at the zero point of the international atomic time as a parameter. Further, the hopping is performed at equal durations, and the router advertisement includes respective hopping durations as a parameter.

In ISA100.11a, it is suggested that the handheld PD transmits the router advertisement on channel 15 or channel 25 of IEEE802.15.4. The wireless device (DBP) receives the router advertisement by scanning channel 15 or channel 25 at startup, and synchronizes the hopping pattern of the wireless device (DBP) with the handheld PD by acquiring the hopping pattern, offset, and durations being used.

Further, definition of channel hopping such as default hopping pattern is described at Paragraph 9.1 (P.249 to P.314) of Non-Patent Document 1, advertisement of the channel hopping setting being used in a wireless subnet in the router advertisement is described at Paragraph 9.3 (P.317 to P.338), and definition of provisioning is described in Chapter 14 (P.666 to P.693).

RELATED ART DOCUMENT

Non-Patent Document

[Non-Patent Document 1] ISA-100,11a-2009, Wireless systems for industrial automation: Process control and related applications Paragraph 9.1 (P.249 to P.314), Paragraph 9.3 (P.317 to P.338), and Chapter 14 (P.666 to P.693)

In the handheld OTA provisioning, since the handheld PD is an independent device, each handheld PD can use an arbitrary parameter with respect to the channel hopping. Accordingly, there is a possibility that a plurality of handheld PDs use the same hopping pattern with the same duration and the same offset. Further, even if the hopping patterns are different from each other between the handheld PDs, there is a possibility that the same channels may overlap each other at the same time. In this case, as shown in FIG. 8B, the provisioning networks constructed by the respective handheld PDs 101 and 101A cause radio interference to occur, and thus the mutual connectivity between the handheld PDs 101 and 101A and the wireless device (DBP) is damaged.

SUMMARY

One or more exemplary embodiments of the present invention provide a communication system and a communication method which can avoid the radio interference between the plurality of networks.

In a communication system, according to an exemplary embodiment, which constructs a communication network using a hopping pattern designated in a router advertisement between a wireless communication device that transmits the router advertisement designating the hopping pattern of channel hopping and an opposite party communication device that receives the router advertisement, the wireless communication device comprises:

a receiver configured to receive a router advertisement transmitted from another wireless communication device;

a generator configured to generate the hopping pattern that does not use the same channel at the same time with respect to a hopping pattern that is designated by the router advertisement received by the receiver; and a transmitter configured to transmit the router advertisement that designates the hopping pattern generated by the generator.

The generator may be configured to generate the hopping pattern having the same period as the hopping pattern that is designated by the router advertisement received by the receiver.

The generator may be configured to generate the hopping pattern having a different temporal offset and the same repeating pattern as the hopping pattern that is designated by the router advertisement received by the receiver.

The generator may be configured to generate the hopping pattern which uses only time slots that are not used by the hopping pattern designated by the router advertisement received by the receiver.

The generator may be configured to generate a hopping pattern according to an instruction through a user interface, and the transmitter is configured to transmit the router advertisement that designates the hopping pattern generated according to the instruction.

The wireless communication device may be a handheld device that uses provisioning.

A communication method, according to an exemplary embodiment, which constructs a communication network using a hopping pattern designated in a router advertisement between a wireless communication device that transmits the router advertisement designating the hopping pattern of channel hopping and an opposite party communication device that receives the router advertisement, comprises:

receiving, by a wireless communication device, a router advertisement transmitted from another wireless communication device;

generating the hopping pattern that does not use the same channel at the same time with respect to a hopping pattern that is designated by the router advertisement received form the other wireless communication device; and transmitting, by the wireless communication device, the router advertisement that designates the generated hopping pattern.

The generated hopping pattern may be a hopping pattern having the same period as the hopping pattern that is designated by the router advertisement received from the other wireless communication device.

The generated hopping pattern may be a hopping pattern having a different temporal offset and the same repeating pattern as the hopping pattern that is designated by the router advertisement received from the other wireless communication device.

The generated hopping pattern may be a hopping pattern which uses only time slots that are not used by the hopping pattern designated by the router advertisement received from the other wireless communication device.

The communication method may further comprise:

generating the hopping pattern according to an instruction through a user interface and transmitting the router advertisement that designates the hopping pattern generated according to the instruction.

According to the communication system according to the present invention, with respect to hopping patterns designated by the received router advertisement, since the hopping patterns that do not use the same channel at the same time are generated, it is possible to avoid the radio interference between the plurality of networks.

According to the communication method according to the present invention, with respect to hopping patterns designated by the received router advertisement, since the hopping patterns that do not use the same channel at the same time are generated, it is possible to avoid the radio interference between the plurality of networks.

DETAILED DESCRIPTION

Hereinafter, a communication system according to an embodiment of the present invention will be described.

Figure 1:
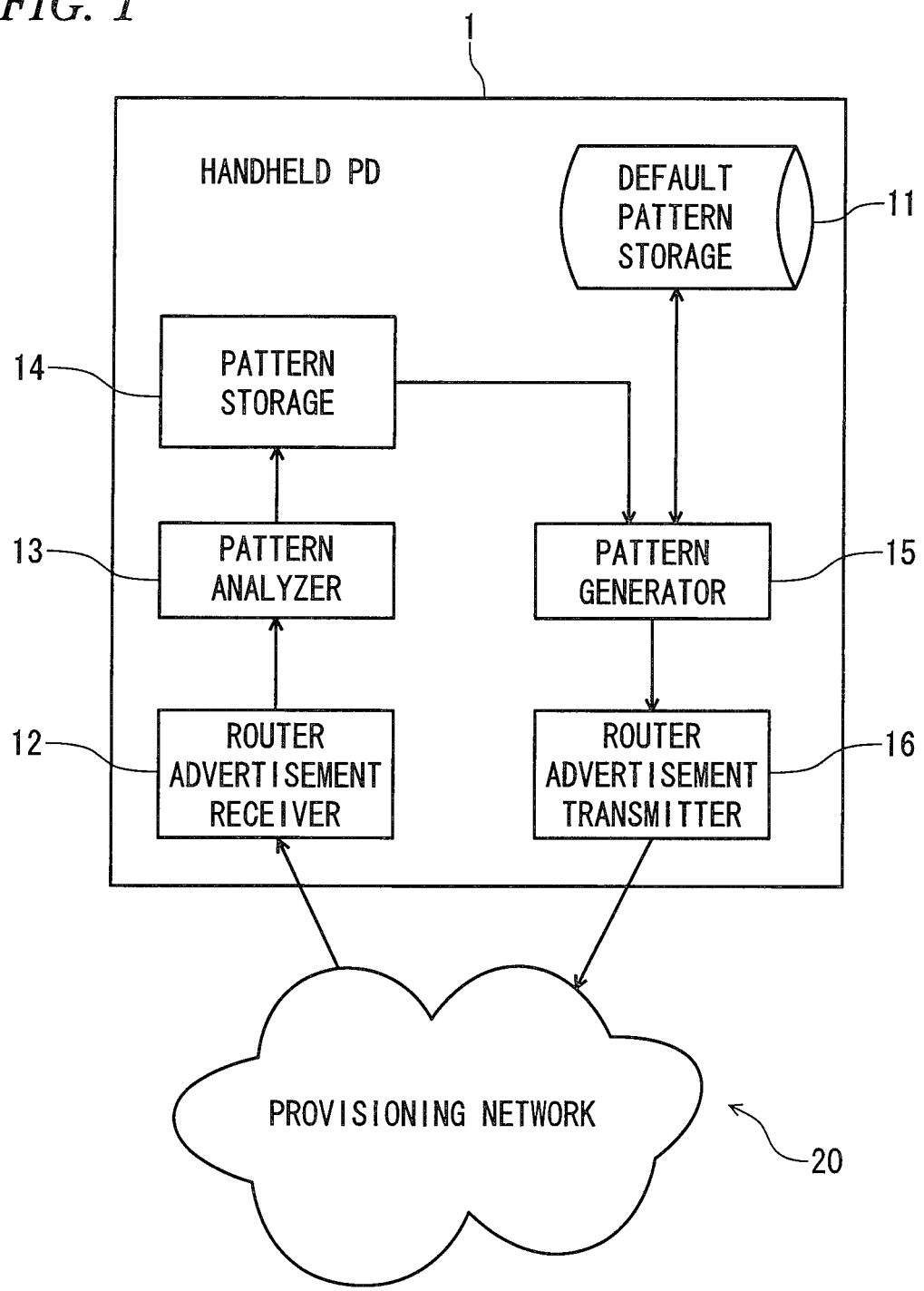
FIG. 1 is a block diagram illustrating the configuration of a handheld PD as a communication system according to an embodiment.

FIG. 1 is a block diagram illustrating the configuration of a handheld PD (Provisioning Device) 1 as a communication system according to an embodiment.

As shown in FIG. 1, a handheld PD 1 includes a default pattern storage 11 storing a default hopping pattern, a router advertisement receiver 12 receiving a router advertisement transmitted from another handheld PD, a pattern analyzer 13 extracting a hopping pattern designated by the router advertisement by analyzing the router advertisement received by the router advertisement receiver 12, a pattern storage 14 storing the hopping pattern extracted by the pattern analyzer 13, a pattern generator 15 generating the hopping pattern that is used by the handheld PD 1 using the default hopping pattern stored in the default pattern storage 11, and a router advertisement transmitter 16 transmitting the router advertisement that designates the hopping pattern generated by the pattern generator 15.

Next, the operation of the handheld PD 1 will be described.

Figure 2:
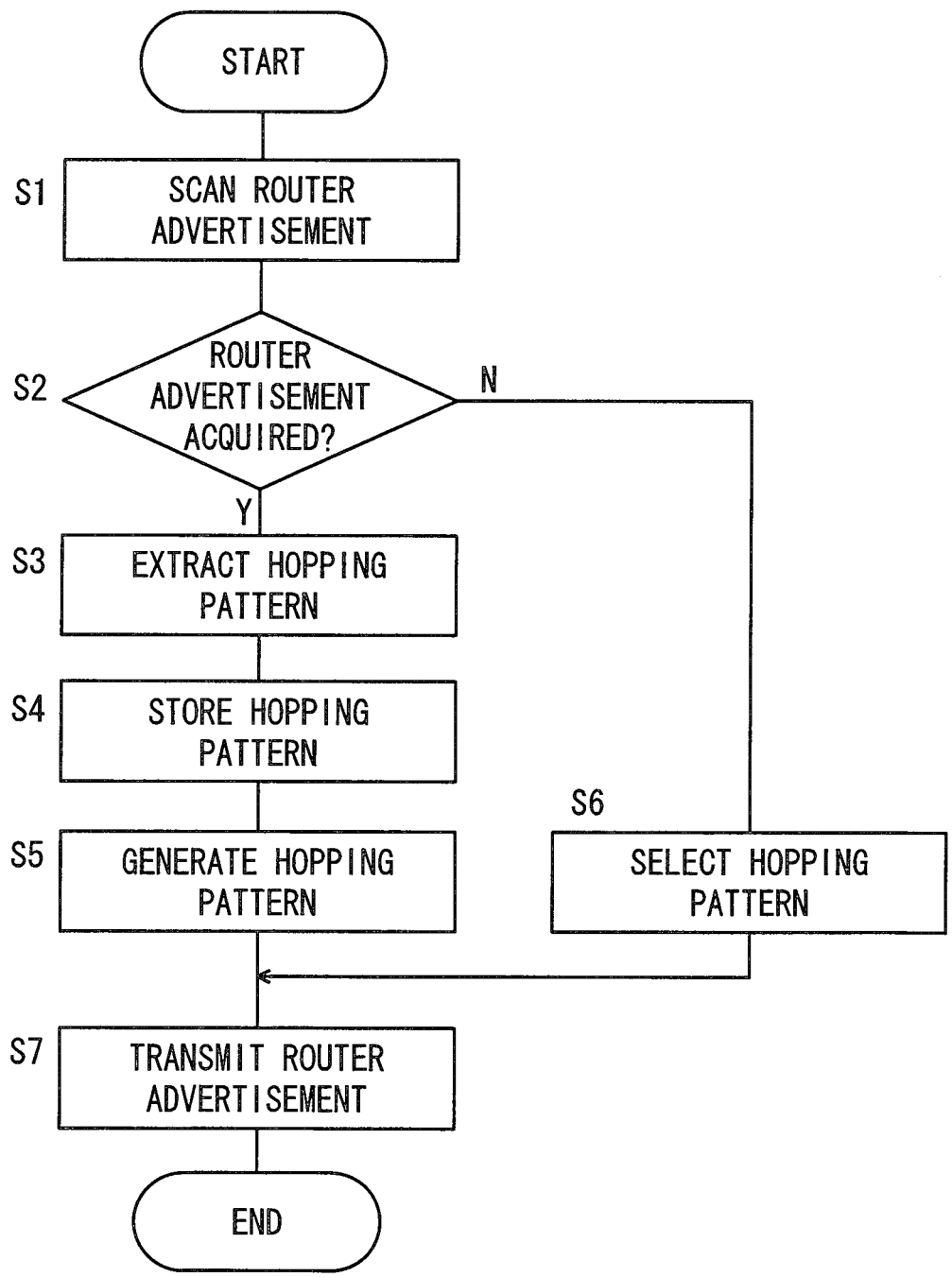
FIG. 2 is a flowchart illustrating the operation of the handheld PD.

FIG. 2 is a flowchart illustrating the operation of the handheld PD 1.

In step S1 of FIG. 2, the router advertisement receiver 12 attempts to acquire the router advertisement that another handheld PD broadcasts on a provisioning network 20 (FIG. 1). Here, in the same manner as the startup of the wireless device (DBP: Device Being Provisioned), the router advertisement can be received by scanning channel 15 or channel 25 in IEEE802.15.4.

Next, in step S2, it is determined whether or not the router advertisement is acquired in step S1, and if the determination result is positive, the processing proceeds to step S3, and if the determination result is negative, the processing proceeds to step S6.

In step S3, the pattern analyzer 13 identifies the hopping pattern, offset, and duration of a channel hopping pattern being used from the router advertisement acquired by the router advertisement receiver 12.

Next, in step S4, the pattern analyzer 13 stores the hopping pattern, offset, and duration identified in step S3 in the pattern storage 14.

Next, in step S5, the pattern generator 15 generates a channel hopping pattern that does not interfere with the hopping pattern identified in step S3, that is, the channel hopping pattern currently used by another handheld PD.

Specifically, the pattern generator 15 selects the same hopping pattern as the hopping pattern identified in step S3.

Figure 3:
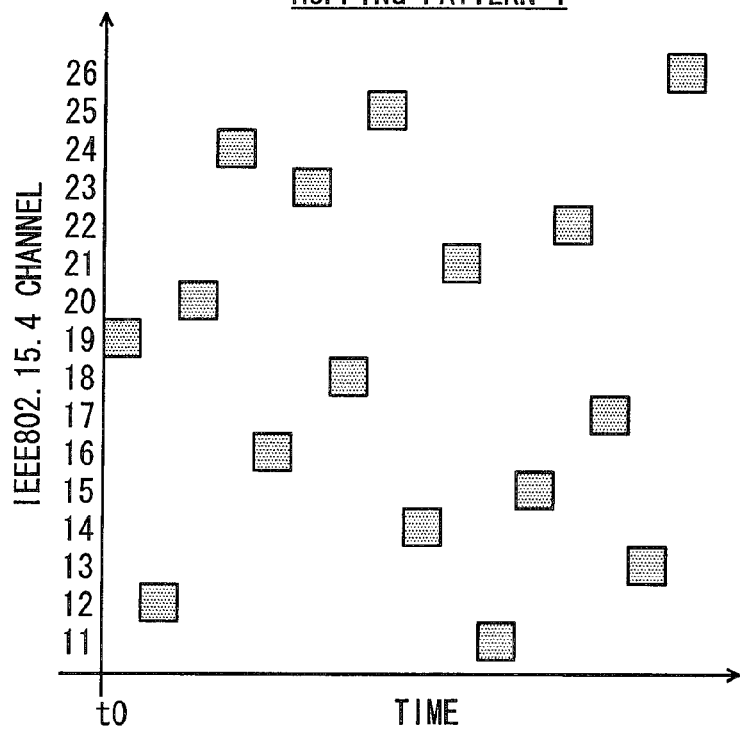
FIG. 3 is a diagram showing default hopping patterns.
Figure 3:
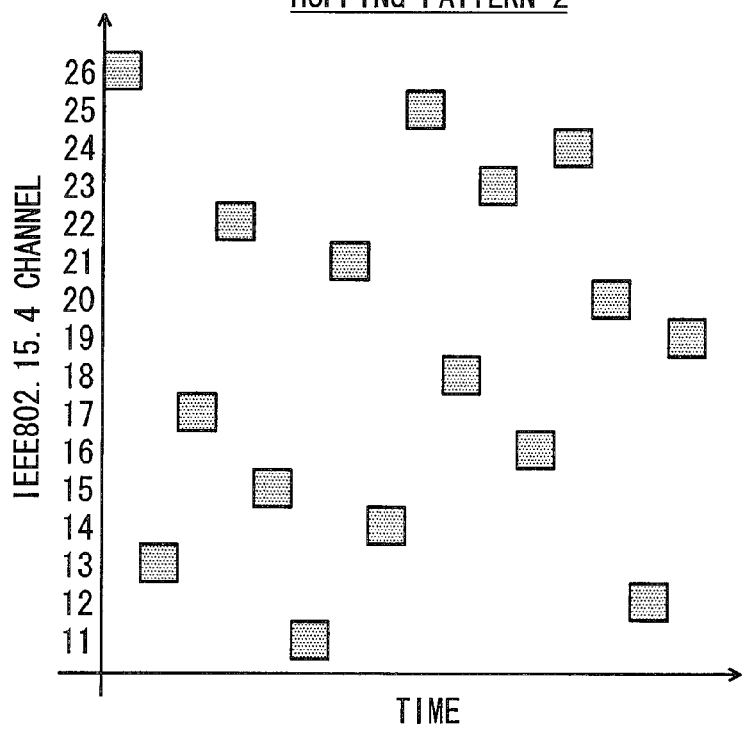
Figure 4:
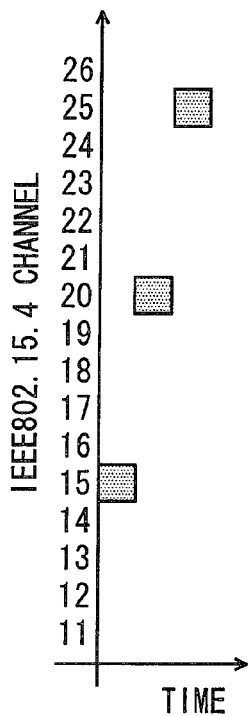
FIG. 4 is a diagram showing default hopping patterns.
Figure 4:
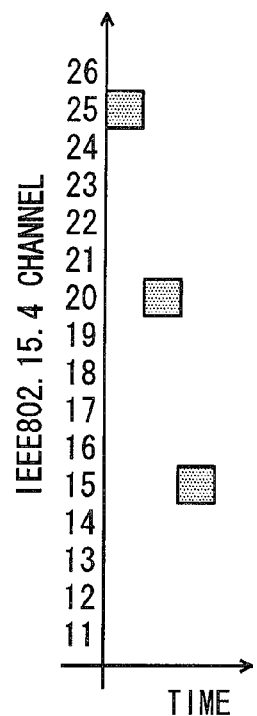
Figure 4:
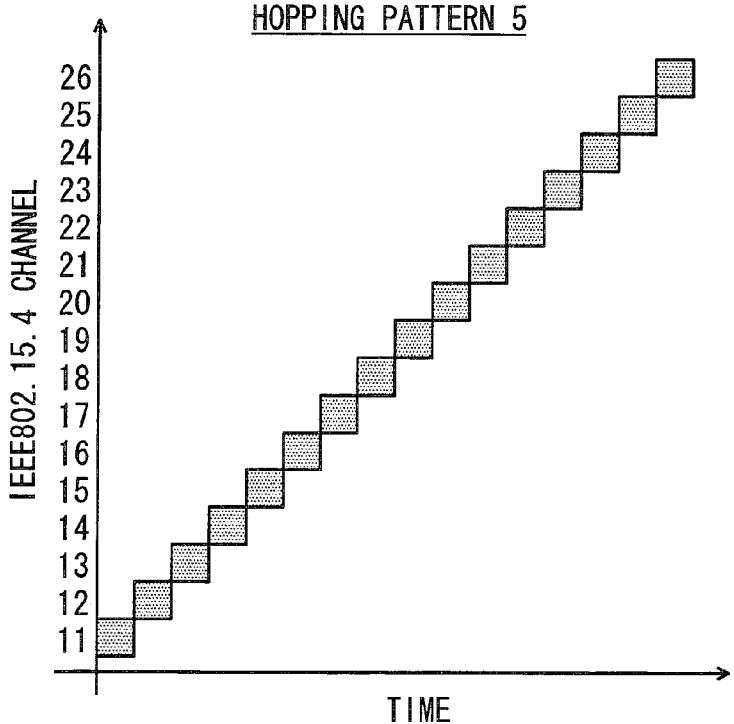

FIGS. 3 and 4 illustrate five default hopping patterns (hopping patterns 1 to 5) defined in ISA100.11a. FIGS. 3 and 4 show one period of each pattern, and in practice, by periodically repeating each pattern, continuous communication becomes possible. The default hopping patterns are stored in the default pattern storage 11, and the pattern generator 15 selects the same hopping pattern as the hopping pattern identified in step S3 from the default pattern storage 11. For example, in step S3, if the hopping pattern 1 (FIG. 3) is identified, the pattern generator 15 selects the hopping pattern 1.

Next, the pattern generator 15 selects the same duration as the duration identified in step S3. Further, the pattern generator 15 selects the offset that is different from the offset identified in step S3. Then, the pattern generator 15 generates a channel hopping pattern in which the selected hopping pattern, duration, and offset are combined.

Figure 5:
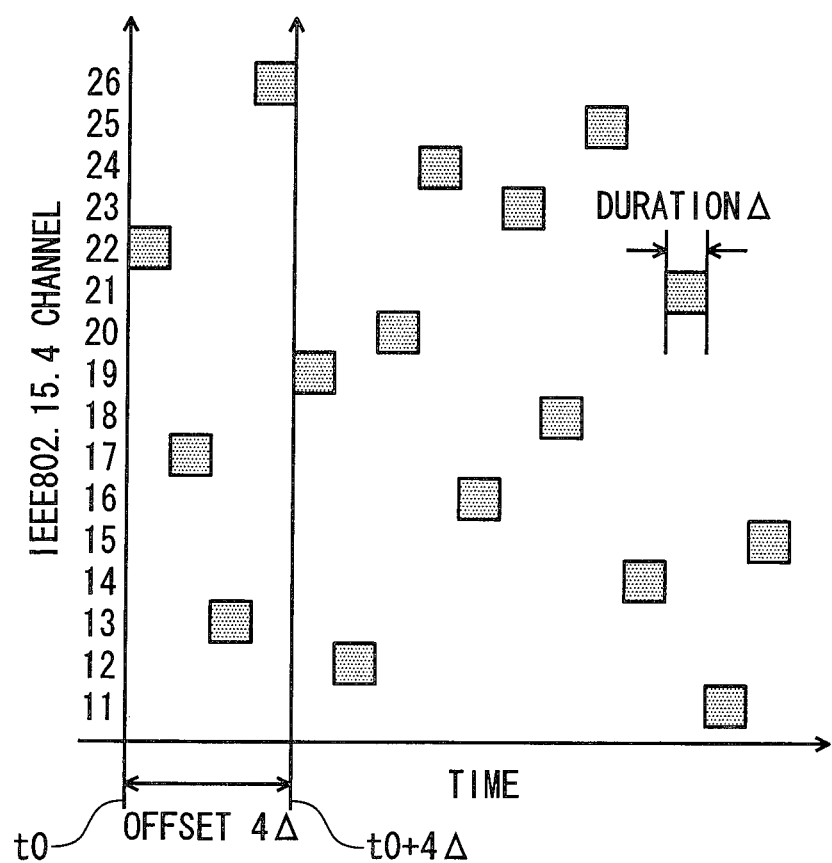
FIG. 5 is a diagram showing the concept of the duration and the offset of the hopping pattern.

FIG. 5 is a diagram showing the concept of the duration and the offset of the hopping pattern. As shown in FIG. 5, the "duration Δ" indicates time in which one channel of the hopping pattern is used. Further, the duration Δ prescribes a period in each default hopping pattern (that is, a cycle each default hopping pattern is repeated), and if the same hopping patterns have the same duration Δ, their periods also become the same. In an example of FIG. 5, the period becomes "16".

Further, "offset" indicates temporal conflict from the default hopping pattern, and has a value that is integer times the duration Δ. In an example shown in FIG. 5, the channel hopping pattern has an offset from the default hopping pattern 1 (FIG. 3) that is four times the duration Δ. As can be known through comparison of the hopping pattern 1 shown in FIG. 3 with the channel hopping pattern shown in FIG. 5, the channel hopping pattern shown in FIG. 5 appears as a pattern that is late as long as the offset "4 Δ" that corresponds to four times the duration Δ with respect to the hopping pattern 1 (FIG. 3) with the time point t0 as its starting point.

As described above, the pattern generator 15 selects and generates a channel hopping pattern that has the same hopping pattern and the same duration but has the different offset with respect to the channel hopping pattern appearing in the router advertisement received from another handheld PD. Through this procedure, it is avoided to use the same channel at the same time with respect to the other handheld PD, and thus the conflict with the other handheld PD can be avoided.

Figure 6:
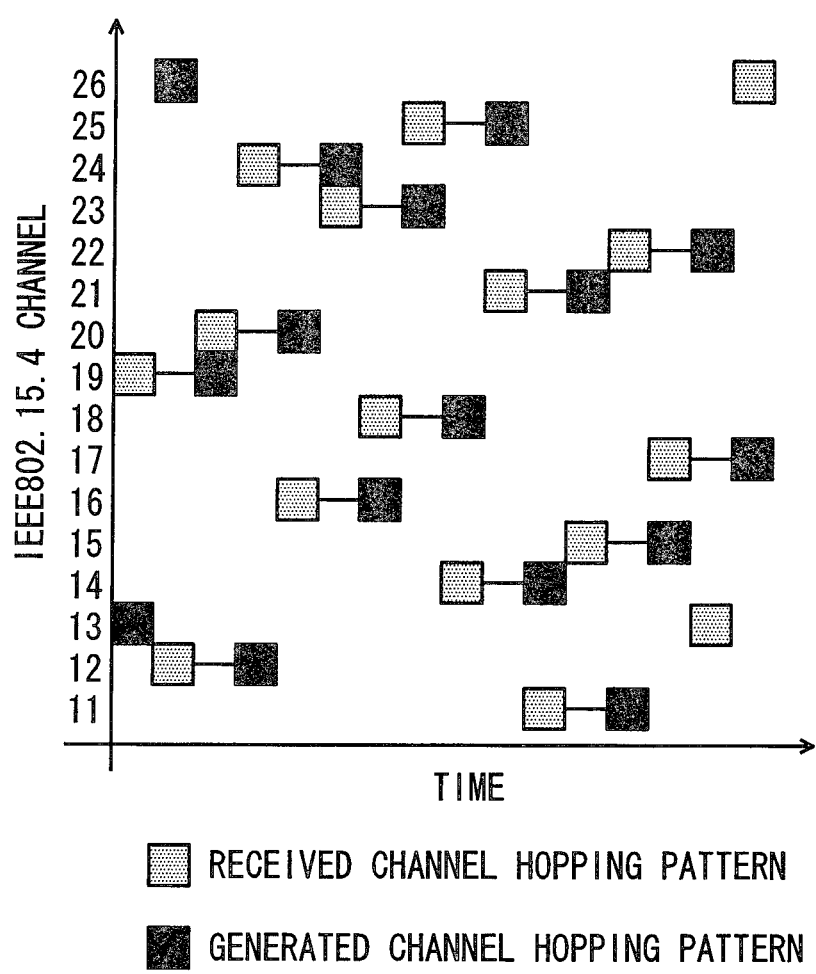
FIG. 6 is a diagram exemplifying the relations between received channel hopping pattern and generated channel hopping pattern.

FIG. 6 is a diagram exemplifying the relations between the channel hopping pattern (received channel hopping pattern) that is used by the other handheld PD and the channel hopping pattern (generated channel hopping pattern) generated by the pattern generator 15. In an example of FIG. 6, by generating a channel hopping pattern having different offset that is twice the duration with respect to the received channel hopping pattern, overlapping of the same channels at the same time, that is, the radio interference, can be avoided. Further, an algorithm that determines the offset in the pattern generator 15 is optional.

Next, in step S7, the router advertisement transmitter 16 broadcasts the router advertisement that designates the channel hopping pattern generated in the above-described procedure on the provisioning network 20 (FIG. 1) to complete the processing.

On the other hand, in step S6, for example, the channel hopping pattern prescribed in advance is selected from the default pattern storage 11, and in step S7, the router advertisement transmitter 16 broadcasts the router advertisement that designates the channel hopping pattern on the provisioning network 20 to complete the processing. In this case (where the determination in step S2 is denied), there is no conflict with the other handheld PD, and thus the channel hopping pattern can be selected according to the existing algorithm.

Figure 7:
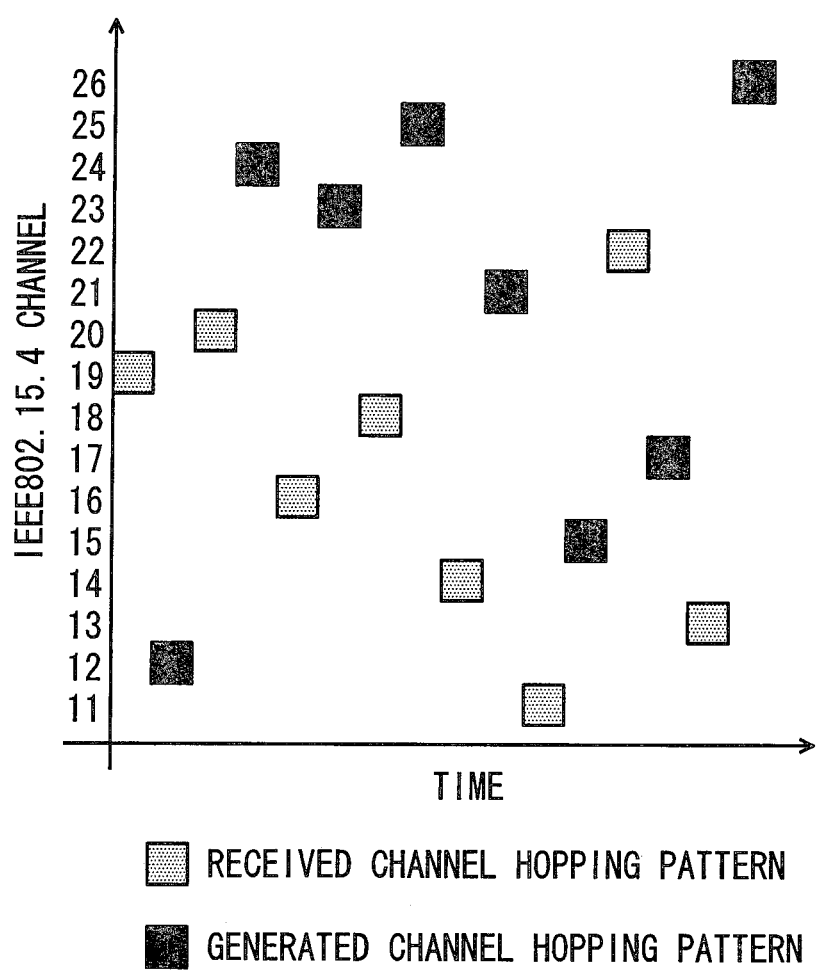
FIG. 7 is a diagram illustrating another algorithm for generating the channel hopping pattern.
Figure 8A:
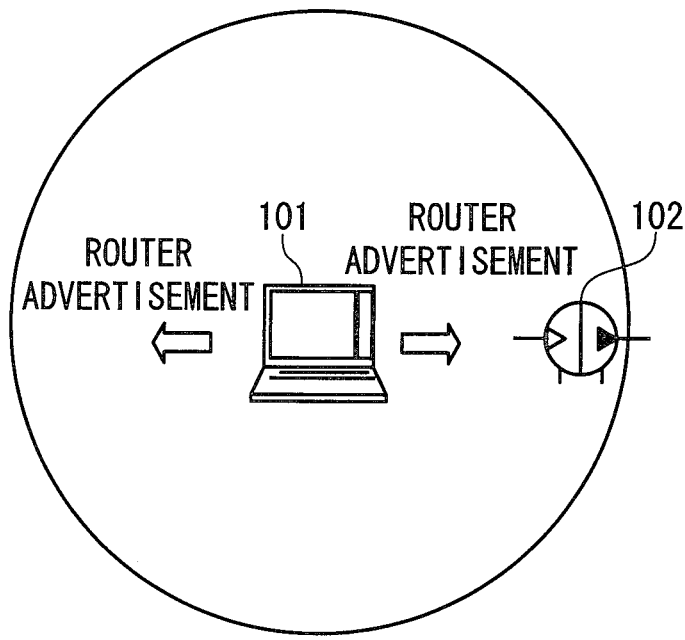
FIG. 8A is a diagram showing a provisioning network.
Figure 8B:
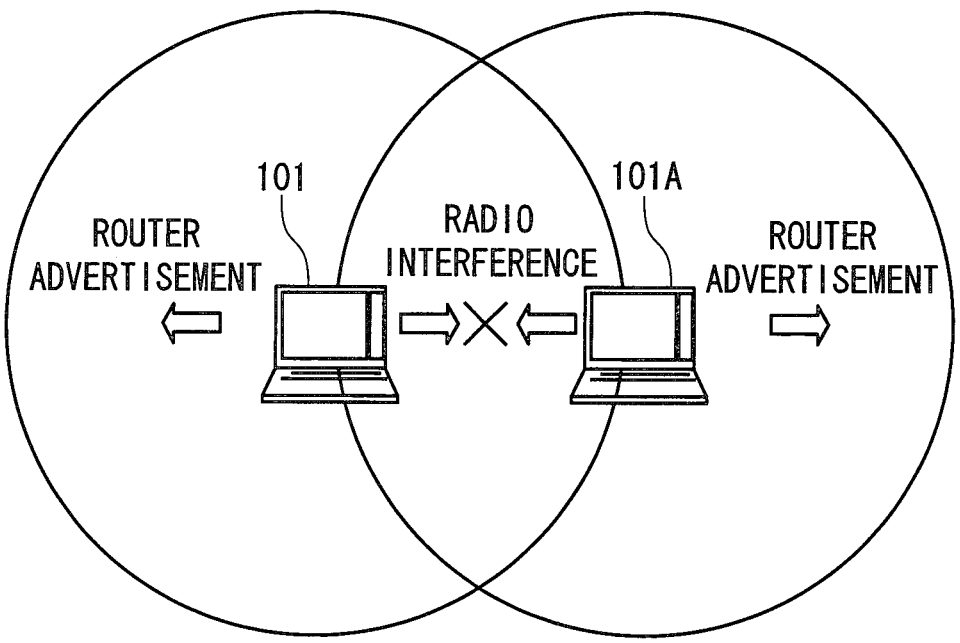
FIG. 8B is a diagram showing a state that provisioning networks are overlapped.

FIG. 7 is a diagram illustrating another algorithm for generating the channel hopping pattern.

In an example shown in FIG. 7, the default hopping pattern is divided by two handheld PD. In FIG. 7, respective handheld PD use ½ of time slots of the hopping pattern 1 shown in FIG. 3, and through this, overlapping of the channel hopping pattern (received channel hopping pattern) that is used by the other handheld PD and the channel hopping pattern (generated channel hopping pattern) generated by the pattern generator 15 is avoided.

In ISA100.11a, when performing the communication in TDMA using the channel hopping, communication is not always performed in a state that channels 11 to 26 of IEEE802.15.4 are occupied. In addition to the channel hopping pattern, timing (link information) to perform transmission/reception in the channel hopping pattern is included in the router advertisement to be transmitted to the wireless device (DBP). Accordingly, by using the timing to perform transmission/reception, which has not been used, with reference to the link information of the received router advertisement, the hopping pattern is actually divided into two, and thus two hopping patterns that do not occur radio interference can be obtained. In an example of FIG. 7, by transmitting the router advertisement including the link information on the contents that the transmission/reception timing that has not been used by the other handheld PD is to be used, the radio interference can be avoided.

In the above-described embodiment, it is exemplified that the channel hopping pattern is adjusted using the router advertisement for the wireless device (DBP). However, it is also possible to add a function of negotiating the channel hopping pattern using other communication means between the handheld PDs.

Further, in the above-described embodiment, although the handheld PD autonomously determines the offset of the hopping pattern being used, it is also possible that the handheld PD notifies a user of the channel hopping pattern that has already been used by another handheld PD through a user interface. In this case, by receiving the user's designation of the offset through the user interface, the user can optionally set the offset.

Further, in the above-described embodiment, it is exemplified that one router advertisement is received. However, in the case of receiving two or more router advertisements, channel hopping patterns that do not conflict with any one of the plurality of channel hopping patterns in which a plurality of router advertisements are designated may be generated and used. In this case, by adjusting the offsets of the hopping patterns used in the respective handheld PDs after limiting the hopping patterns and the durations (periods) that can be used in all the handheld PDs, the radio interference can be avoided even in the case where the provisioning networks of the plural handheld PDs overlap each other.

The application range of the present invention is not limited to the above-described embodiment. The present invention can be widely applied to a communication system or the like, which constructs a communication network using the hopping pattern designated in the router advertisement between the wireless communication device that transmits the router advertisement that designates the hopping pattern of channel hopping and the opposite party communication device that receives the router advertisement.

What is claimed is:

1. A wireless communication system comprising a first wireless communication device wirelessly communicating with a second wireless communication device to establish a first provisioning network, the second wireless communication device receiving at least one provisioning parameter from the first wireless communication device over the first provisioning network to join a target communication network that is different from the first provisioning network, the first wireless communication device having:
    a receiver configured to receive a router advertisement transmitted from another wireless communication device in a second provisioning network that is different from the first provisioning network and the target communication network, the router advertisement designating a channel hopping pattern used by the another wireless communication device, the channel hopping pattern used by the another wireless communication device identifying a plurality of channels and a time slot for using each of the plurality of channels, the channel hopping pattern used by the another wireless communication device including at least one time slot not used for the plurality of channels and at least one channel in the plurality of channels that is not used;
    a generator configured to generate, when the router advertisement is received by the receiver, a channel hopping pattern that does not use a same channel at a same time defined in the channel hopping pattern designated by the router advertisement received by the receiver, and configured to select, when the router advertisement is not received by the receiver, a channel hopping pattern prescribed in advance; and
    a transmitter configured to transmit a router advertisement designating the generated channel hopping pattern after the generator generates the generated channel hopping pattern when the router advertisement is received by the receiver, and configured to transmit a router advertisement that designates the channel hopping pattern selected by the generator after the generator selects the channel hopping pattern when the router advertisement is not received by the receiver, and
    the second wireless communication device receiving the router advertisement transmitted from the first wireless communication device to establish the first provisioning network with the first wireless communication device using the channel hopping pattern designated in the router advertisement received from the first wireless communication device,
    wherein the generator is configured to generate the channel hopping pattern which uses only the at least one time slot not used for the plurality of channels and the at least one channel in the plurality of channels that is not used in the channel hopping pattern used by the another wireless communication device.

2. The wireless communication system according to claim 1, wherein the router advertisement having the designated channel hopping pattern is part of an OTA (Over The Air) provisioning in a TDMA (Time Division Multiple Access) communication protocol.

3. The wireless communication system according to claim 1, wherein the first wireless communication device is a provisioning device, and
    wherein the second wireless communication device is provisioned in the first provisioning network established between the provisioning device and the second wireless communication device in order to join the target communication network.

4. The wireless communication system according to claim 3, wherein the provisioning device is a handheld provisioning device.

5. The wireless communication system according to claim 1, wherein the channel hopping pattern generated by the generator is repeated.

6. The wireless communication system according to claim 1,
    wherein the router advertisement received from the another wireless communication device includes a link information indicating a timing to perform transmission and reception, and
    wherein the first wireless communication device performs transmission and reception using a timing not used in the link information in the router advertisement received from the another wireless communication device.

7. A wireless communication method comprising:
    determining, by a first wireless communication device, whether a router advertisement is received from another wireless communication device in another provisioning network, the router advertisement designating a channel hopping pattern used by the another wireless communication device, the channel hopping pattern used by the another wireless communication device identifying a plurality of channels and a time slot for using each of the plurality of channels, the channel hopping pattern used by the another wireless communication device including at least one time slot not used for the plurality of channels and at least one channel in the plurality of channels that is not used;
    generating, when said determining determines the router advertisement is received, a channel hopping pattern that does not use a same channel at a same time defined in the channel hopping pattern designated by the router advertisement received from the another wireless communication device;
    selecting, when said determining determines the router advertisement is not received, a channel hopping pattern prescribed in advance;
    transmitting, by the first wireless communication device, a router advertisement designating the generated channel hopping pattern when said determining determines the router advertisement is received, and a router advertisement designating the selected channel hopping pattern after said selecting when said determining determines the router advertisement is not received;
    establishing, by a second wireless communication device, a first provisioning network between the first wireless communication device and the second wireless communication device, using the channel hopping pattern designated in the router advertisement received from the first wireless communication device; and receiving, by the second wireless communication device, over the first provisioning network at least one provisioning parameter from the first wireless communication device to join a target communication network different from the first provisioning network and the another provisioning network, wherein the generated channel hopping pattern uses only the at least one time slot not used for the plurality of channels and the at least one channel in the plurality of channels that is not used in the channel hopping pattern used by the another wireless communication device.

8. The wireless communication method according to claim 7, wherein the router advertisement having the designated channel hopping pattern is part of an OTA (Over The Air) provisioning in a TDMA (Time Division Multiple Access) communication protocol.

9. The wireless communication method according to claim 7, wherein the first wireless communication device is a provisioning device, the another wireless communication device is another provisioning device, wherein the second wireless communication device is provisioned in the first provisioning network established between the provisioning device and the second wireless communication device in order to join the target communication network.

10. The wireless communication method according to claim 9, wherein the provisioning device is a handheld provisioning device.

11. The wireless communication system according to claim 7, wherein the generated channel hopping pattern is repeated.

12. The wireless communication system according to claim 7, wherein the router advertisement received from the another wireless communication device includes a link information indicating a timing to perform transmission and reception, and wherein the first wireless communication device performs transmission and reception using a timing not used in the link information in the router advertisement received from the another wireless communication device.

* * * * *